US011337786B2

(12) United States Patent
Liu

(10) Patent No.: US 11,337,786 B2
(45) Date of Patent: May 24, 2022

(54) AUTOMATIC CONTROL TYPE ELECTRIC TOOTHBRUSH

(71) Applicant: Shanlin Liu, Guangdong (CN)

(72) Inventor: Shanlin Liu, Guangdong (CN)

(73) Assignee: Shanlin Liu, Huizhou (CN)

( * ) Notice: Subject to any disclaimer, the term of this patent is extended or adjusted under 35 U.S.C. 154(b) by 170 days.

(21) Appl. No.: 16/621,690

(22) PCT Filed: Jul. 6, 2018

(86) PCT No.: PCT/CN2018/094808
§ 371 (c)(1),
(2) Date: Dec. 11, 2019

(87) PCT Pub. No.: WO2019/033870
PCT Pub. Date: Feb. 21, 2019

(65) Prior Publication Data
US 2020/0107918 A1 Apr. 9, 2020

(30) Foreign Application Priority Data
Aug. 16, 2017 (CN) .......................... 201710701194.1

(51) Int. Cl.
*A61C 17/22* (2006.01)
*A46B 13/02* (2006.01)
(Continued)

(52) U.S. Cl.
CPC .............. *A61C 17/221* (2013.01); *A46B 9/04* (2013.01); *A46B 13/026* (2013.01); *A46B 15/0006* (2013.01); *A61C 17/26* (2013.01)

(58) Field of Classification Search
CPC ..... A61C 17/221; A61C 17/26; A46B 13/026; A46B 15/0006
See application file for complete search history.

(56) References Cited

U.S. PATENT DOCUMENTS

2017/0069083 A1* 3/2017 Vetter ................. A61B 5/1128

FOREIGN PATENT DOCUMENTS

CN 101969878 A 2/2011
CN 102046041 A 5/2011
(Continued)

OTHER PUBLICATIONS

International Search Report of PCT Patent Application No. PCT/CN2018/094808 dated Sep. 25, 2018.

*Primary Examiner* — Randall E Chin

(57) ABSTRACT

Provided is an automatic control type electric toothbrush, comprising a toothbrush head (20) and a toothbrush handle (10) connected by means of a driving shaft (12), wherein the toothbrush handle (10) is provided with a gesture sensor, a control module and a driving mechanism; and the control module can control the driving mechanism to drive the driving shaft (12), and same also drives the toothbrush head (20) to rotate clockwise or anticlockwise according to gesture data acquired from the gesture sensor, so that the toothbrush head (20) rotates in the direction from teeth root to dental crown. The automatic control type electric toothbrush can realize the purpose of automatically brushing teeth along the teeth, and can protect the gingivae, thus achieving automated treatment without manual control by a user, and therefore improving user experience.

4 Claims, 4 Drawing Sheets

(51) Int. Cl.
*A46B 15/00* (2006.01)
*A61C 17/26* (2006.01)
*A46B 9/04* (2006.01)

(56) References Cited

FOREIGN PATENT DOCUMENTS

| | | |
|---|---|---|
| CN | 204016535 U | 12/2014 |
| CN | 105943180 A | 9/2016 |
| JP | 2000510364 A | 8/2000 |
| JP | 2009240759 A | 10/2009 |
| WO | WO 97/42908 * | 11/1997 |

* cited by examiner

AUTOMATIC CONTROL TYPE ELECTRIC TOOTHBRUSH

FIELD

The present application generally relates to daily electronic products, more particularly to an automatic control type electric toothbrush.

BACKGROUND

At present, most people use electric toothbrushes with high-frequency reciprocating rotation and up-and-down vibration to brush their teeth. If they are not used properly, they will cause gum damage. The electric toothbrush in the prior art has a defect that the rotation direction cannot be controlled, or a defect that the rotation direction needs to be controlled manually. It cannot be automated and intelligent, and user experience is greatly reduced.

SUMMARY

The technical problem to be solved by the present application is to provide an automatic control type electric toothbrush against the above-mentioned defects of the prior art.

The technical solution adopted by the present application to solve its technical problems is to construct an automatic control type electric toothbrush, comprising a toothbrush head and a toothbrush handle which is connected to the toothbrush head by a driving shaft, wherein the toothbrush handle is provided with an attitude sensor, a control module, and a driving mechanism, and the control module controls the driving mechanism to drive the driving shaft to rotate the toothbrush head clockwise or counterclockwise according to attitude data obtained by the attitude sensor, so that the toothbrush head is rotated in a direction from a tooth root to a dental crown.

In the automatic control type electric toothbrush according to the present application, a protective cover is provided at an end of the toothbrush handle corresponding to the toothbrush head, and an opening is formed on a side wall of the protective cover for bristles of the toothbrush head to protrude; and a X axis of a coordinate system of the attitude sensor is parallel to the toothbrush handle, a Y axis of the coordinate system is perpendicular to a mid-plane of the protective cover, and a Z axis of the coordinate system is perpendicular to a plane where the X axis and the Y axis are located.

In the automatic control type electric toothbrush according to the present application, the attitude data includes XYZ coordinate data, and the control module performs following processing based on the XYZ coordinate data: calculating a pitch angle and a roll angle based on the XYZ coordinate data; and controlling rotation direction of a motor based on the pitch angle and the roll angle.

In the automatic control type electric toothbrush according to the present application, said calculating a pitch angle and a roll angle based on the XYZ coordinate data specifically comprises: calculating the pitch angle based on Y coordinate data and Z coordinate data according to a formula a tan 2(accY, accZ); and calculating the roll angle based on X coordinate data, Y coordinate data and Z coordinate data according to a formula a tan(−accX/sqrt(accY*accY+accZ*accZ)).

In the automatic control type electric toothbrush according to the present application, said controlling rotation direction of a motor based on the pitch angle and the roll angle specifically comprises:

if the pitch angle and the roll angle are both positive or both negative, and absolute values of the pitch angle and the roll angle are both greater than a preset angle, the motor is controlled to run in a forward direction, and the motor drives the driving shaft to rotate the toothbrush head clockwise; and if one of the pitch angle and the roll angle is positive and the other is negative, and absolute values of the pitch angle and the roll angle are both greater than a preset angle, the motor is controlled to run in a reversed direction, and the motor drives the driving shaft to rotate the toothbrush head counterclockwise.

In the automatic control type electric toothbrush according to the present application, the preset angle is 5°.

In the automatic control type electric toothbrush according to the present application, the attitude sensor integrates a three-axis accelerometer and a three-axis gyroscope, the driving mechanism comprises a motor, and the control module comprises a power supply circuit, an MCU (Microcontroller Unit) and a motor driving circuit, wherein the attitude sensor and the motor are connected to the MCU, the motor driving circuit is connected to the motor and the MCU respectively, and the power supply circuit is connected to the attitude sensor, the motor, the motor driving circuit, and the MCU, respectively.

In the automatic control type electric toothbrush according to the present application, the motor driving circuit comprises a LG9110 driving chip, the power supply circuit comprises an LN1134 power chip, the attitude sensor uses an MPU6050 sensor chip, and the MCU uses a STM8S103 Control chip.

Implementing the automatic control type electric toothbrush of the present application has the following beneficial effects: the automatic control type electric toothbrush of the present application can control a driving mechanism to drive a toothbrush head to rotate clockwise or counterclockwise around a driving shaft according to attitude data obtained by an attitude sensor, so that the toothbrush head is rotated in a direction from the tooth root to the dental crown, and a purpose of automatically brushing the teeth along the teeth is realized, which can protect the gums, and the automatic processing does not require manual control by the user, which improves the user experience.

BRIEF DESCRIPTION OF THE DRAWINGS

In order to more clearly explain embodiments of the present application or technical solutions in the prior art, drawings used in the description of the embodiments or the prior art will be briefly introduced below. Obviously, the drawings in the following description are merely embodiments of the present application. For those of ordinary skill in the art, other drawings can be obtained according to the provided drawings without paying creative labor.

DETAILED DESCRIPTION

Figure 1:
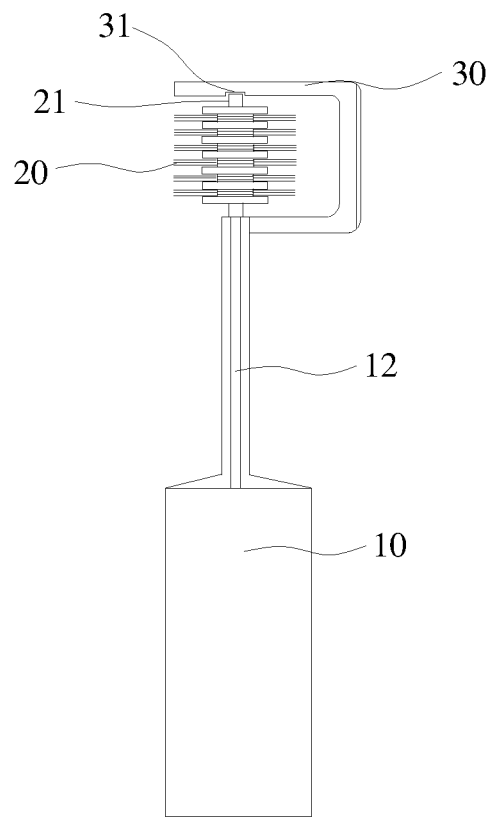
FIG. 1 is a schematic structural diagram of an electric toothbrush according to an embodiment of the present application.

In order to facilitate understanding of the present application, the present application will be described more fully hereinafter with reference to the accompanying drawings. Exemplary embodiments of the application are shown in the drawings. However, the application can be implemented in many different forms and is not limited to the embodiments described herein. Rather, these embodiments are provided so that this disclosure will be thorough and complete.

It should be noted that when an element is referred to as being "fixed to" another element, it may be directly on the other element or there may be a centered element. When an element is considered to be "connected" to another element, it can be directly connected to the other element or intervening elements may also be present. The terms "vertical", "horizontal", "left", "right" and similar expressions used herein are for illustrative purposes only.

Unless defined otherwise, all technical and scientific terms used herein have the same meaning as commonly understood by one of ordinary skill in the art to which this application belongs. The terminology used herein in the description of the present application is only for the purpose of describing specific embodiments, and is not intended to limit the present application.

A general idea of the present application is to design an automatic control type electric toothbrush, comprising a toothbrush head and a toothbrush handle connected by a driving shaft, wherein the toothbrush handle is provided with an attitude sensor, a control module, and a driving mechanism, and the control module may control the driving mechanism to drive the toothbrush head to rotate clockwise or counterclockwise around the driving shaft according to attitude data obtained by the attitude sensor, so that the toothbrush head being rotated in a direction from the tooth root to the dental crown is realized.

In order to better understand the above technical solution, the above technical solution will be described in detail with reference to the accompanying drawings and specific implementations of the specification. It should be understood that the embodiments of the present application and specific features in the embodiments are detailed descriptions of the technical solutions of the present application. The description is not a limitation on the technical solutions of the present application. In the case of no conflict, the embodiments of the present application and the technical features in the embodiments can be combined with each other.

Referring to FIG. 1, an electric toothbrush according to an embodiment of the present application comprises a toothbrush head 20 and a toothbrush handle 10 which is connected to the toothbrush head 20 by a driving shaft 12. Specifically, the toothbrush head 20 comprises a main shaft 21 that is drivingly connected to the driving shaft 12 and has a common axial direction, and bristles coaxially sleeved on the main shaft 21. A protective cover 30 is provided at the end of the toothbrush handle 10 corresponding to the toothbrush head 20, and an opening is formed on the side wall of the protective cover 30 for the bristles of the toothbrush head 20 to protrude. A limiting hole 31 is provided on an end of the protective cover 30 remote from the toothbrush handle 10, and an end of the main shaft 21 of the toothbrush head 20 is rotatably received in the limiting hole 31.

Figure 2:
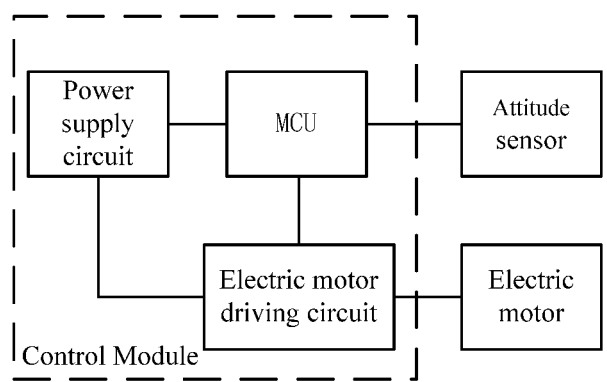
FIG. 2 is a circuit block diagram of an electric toothbrush according to an embodiment of the present application.

Referring to FIG. 2, the toothbrush handle 10 is provided with an attitude sensor, a control module, and a driving mechanism. The attitude sensor integrates a three-axis accelerometer and a three-axis gyroscope. The driving mechanism comprises a motor. The control module comprises a power supply circuit, a MCU, and a motor driving circuit. The attitude sensor and the motor are connected to the MCU, the motor driving circuit is connected to the motor and the MCU, and the power supply circuit is connected to the attitude sensor, the motor, the motor driving circuit, and the MCU, respectively.

Among them, the motor driving circuit is used to drive the motor under control of the MCU. The power supply circuit is used to power the entire toothbrush. The attitude sensor can acquire acceleration data and gyroscope data in real time. Acceleration data is the output data of three accelerometers, that is, XYZ coordinate data. The MCU can calculate pitch angles and roll angles based on the XYZ coordinate data obtained by the attitude sensor, and then perform complementary filtering on the pitch angles and roll angles based on the gyroscope data, and then control rotation direction of the motor based on the processed pitch angles and roll angles, thus drive the driving shaft 12 to drive the toothbrush head 20 to rotate clockwise or counterclockwise, so that the toothbrush head 20 rotates in a direction from the tooth root to the dental crown.

Figure 3:
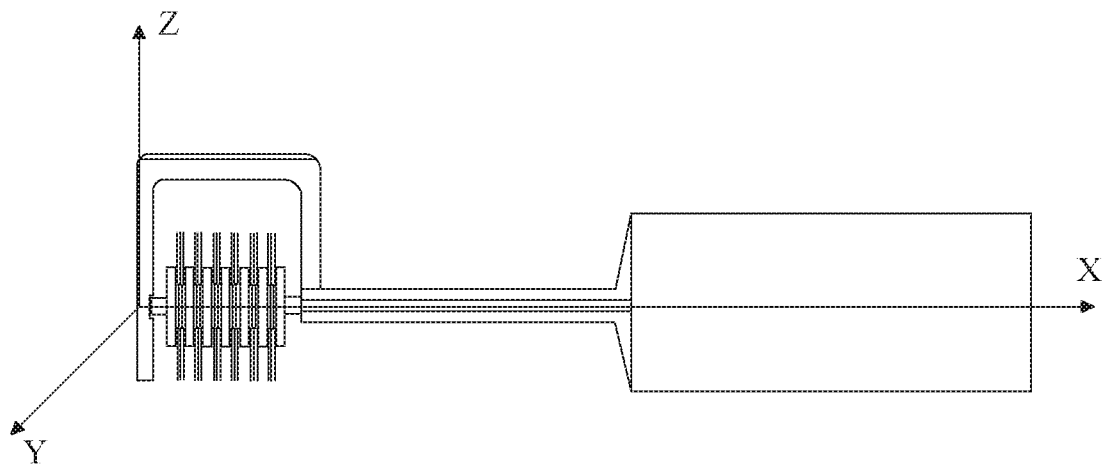
FIG. 3 is a schematic diagram of establishing a coordinate system.

Among the XYZ coordinates on which the attitude sensor is based, Y axis is the forward axis, X axis is the right axis, and Z axis is the upward axis. Rotation around the forward axis is the roll angle, rotation around the right axis is the pitch angle, and rotation around the upward axis is a heading angle. Specifically, referring to FIG. 3, in this embodiment, the toothbrush head is used as an origin, the X axis is parallel to the toothbrush handle, the Y axis is perpendicular to a mid-plane of the protective cover, and the Z axis is perpendicular to a plane where the X and Y axes are located.

The calculation of the pitch angle and the roll angle based on the XYZ coordinate data specifically includes: calculating the pitch angle based on the Y coordinate data and the Z coordinate data according to the formula a tan 2(accY, accZ); and calculating the roll angle based on the X coordinate data, the Y coordinate data and the Z coordinate data according to the formula (−accX/sqrt(accY*accY+accZ*accZ)).

Figure 4:
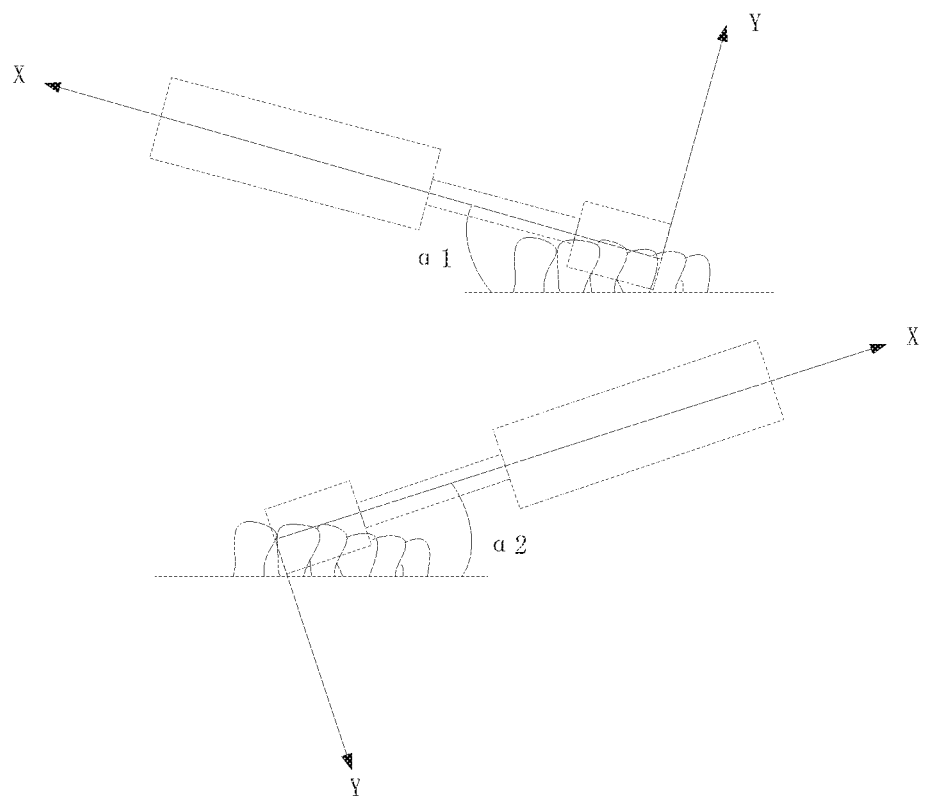
FIG. 4 is a comparison view of brushing left and right lower teeth.
Figure 5:
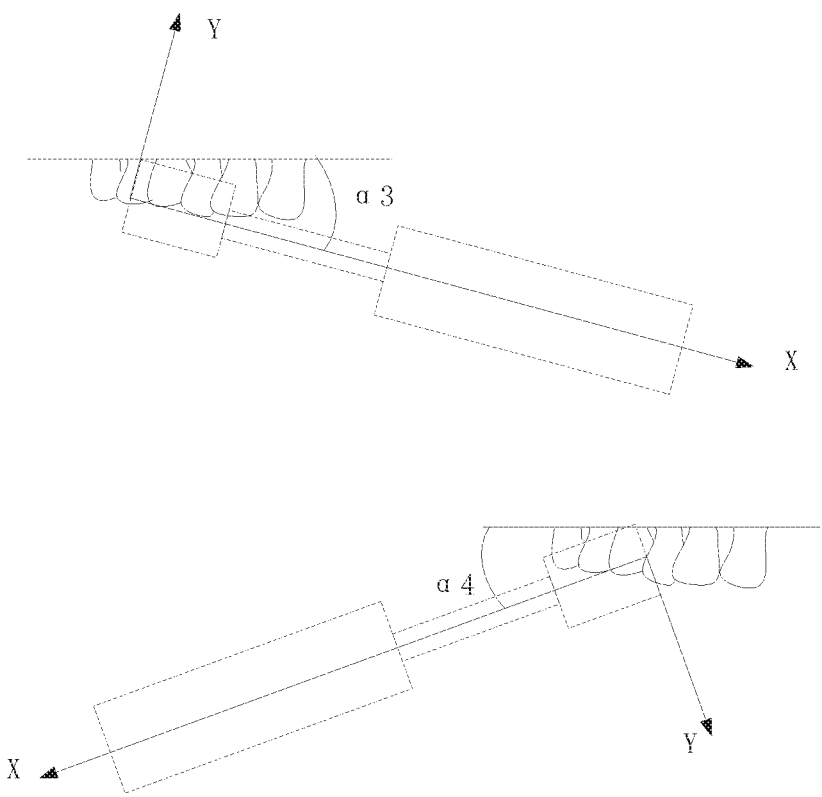
FIG. 5 is a comparison view of brushing left and right upper teeth.

The following describes how to control rotation direction of the motor according to the pitch angles and roll angles with reference to FIGS. 4-5.

Firstly the following four cases of brushing outside of the teeth are considered: outside of the left lower teeth, outside of the right lower teeth, outside of the left upper teeth, and outside of the right upper teeth.

When brushing teeth, no matter which case the situation is, the ultimate goal is to rotate the toothbrush head from the tooth root to the dental crown. Obviously, the rotation direction of the toothbrush head when brushing the outside of the left lower teeth should be opposite to the rotation direction of the toothbrush head when brushing the outside of the right lower teeth. Similarly, the rotation direction of the brush head when brushing the outside of the left upper teeth should be opposite to the rotation direction of the brush head when brushing the outside of the right upper teeth. However, the rotation direction of the toothbrush head is the same when brushing the outside of the left lower teeth and the outside of the right upper teeth, and the rotation direction of the toothbrush head is the same when brushing the outside of the right lower teeth and the outside of the left upper teeth.

The rotation of the toothbrush head can be selected in two directions: clockwise and counterclockwise. We define the rotation of the toothbrush head rotating from the tooth root to the dental crown when brushing the outside of the left lower tooth as a clockwise rotation. Obviously, when brushing the outside of the left lower tooth and the right upper tooth, the toothbrush head rotates clockwise. When brushing the outside of the right lower teeth and the left upper teeth, the toothbrush head rotates counterclockwise. Therefore, as long as the toothbrush can automatically determine a specific brushing situation, it can know how to control the rotation of the motor.

Referring to FIGS. 4 and 5, the upper diagrams in FIGS. 4 and 5 show the cases of brushing the left teeth, and the lower diagrams in FIGS. 4 and 5 show the cases of brushing the right teeth. Regardless of the left or right teeth, the direction of the pitch angles is the same. Therefore, α1 and α2 are both positive, and α3 and α4 are both negative. But when brushing the left and right sides of the upper teeth, the Y axis turned 180 degrees, so the direction of the roll angles of brushing the left and right lower teeth is opposite, with β1 being positive and β2 being negative. Similarly, when brushing the left and right sides of the lower teeth, the Y axis also flips 180 degrees, so the direction of the roll angles of brushing the left and right upper teeth is opposite, with β3 being positive and β4 being negative. Therefore, it can be determined which case the brushing situation is according to the directions of the pitch angles and the roll angles, and then the motor can be controlled to rotate according to the specific brushing situation.

Similarly, referring to FIG. 5, the upper diagram shows the case of brushing the left tooth, and the lower diagram shows the case of brushing the right tooth. Whether it is the left or right teeth, the direction of the pitch angles is the same, with α3 and α4 being negative. However, the Y axis is flipped 180 degree, so the direction of roll angles is opposite, with β3 being positive and β4 being negative. Therefore, according to the pitch angles and the roll angles, the specific brushing situation can be determined, and then the motor can be controlled to rotate according to the specific brushing situation.

The following other four cases of brushing inside of the teeth are considered: inside of the left lower teeth, inside of the right lower teeth, inside of the left upper teeth, and inside of the right upper teeth. Because the directions of the pitch angles and the roll angles (that is, the positive or negative of the angles) are the same when brushing the inside of the right lower teeth and the outside of the left lower teeth, and requirements for the rotation direction of the toothbrush head are the same, the control process of brushing the inside of the right lower teeth and the outside of the left lower teeth are the same. Similarly, the control process of brushing the inside of the left lower teeth and the outside of the right lower teeth are the same, the control process of brushing the inside of the right upper teeth and the outside of the left upper teeth are the same, and the control process of brushing the inside of the left upper teeth and the outside of the right upper teeth are the same.

Therefore, according to the above analysis, controlling the rotation direction of the motor according to the pitch angles and the roll angles specifically comprises: if the pitch angle and the roll angle are both positive or both negative, and absolute values of the pitch angle and the roll angle are both greater than a preset angle, the motor is controlled to run in a forward direction, and the motor drives the driving shaft to rotate the toothbrush head clockwise; if one of the pitch angle and the roll angle is positive and the other is negative, and the absolute values of the pitch angle and the roll angle are both greater than the preset angle, the motor is controlled to run in a reversed direction, and the motor drives the driving shaft to rotate the toothbrush head counterclockwise.

The preset angle is set based on experience. The preset angle is set to ensure that the toothbrush handle 10 is higher than the toothbrush head 20 when brushing the lower teeth, and the toothbrush handle 10 is lower than the toothbrush when brushing the upper teeth. For example, in a specific embodiment, the preset angle is 5°.

Figure 6:
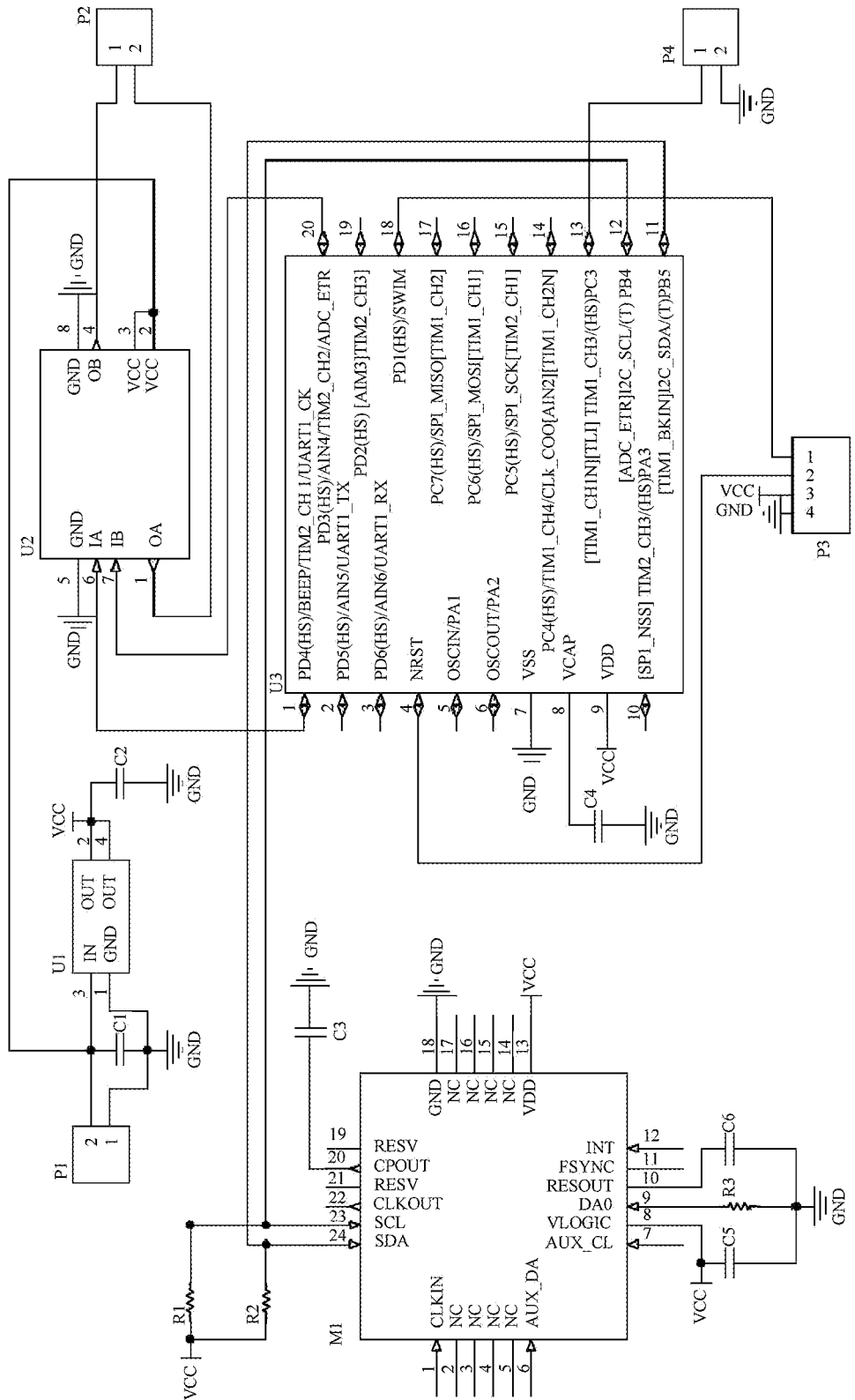
FIG. 6 is a circuit diagram of an electric toothbrush according to an specific embodiment of the present application.

Referring to FIG. 6, a specific implementation circuit is described below.

In a specific embodiment, the motor driving circuit comprises a LG9110 driving chip U2, and the power supply circuit comprises a LN1134 power chip U1, which can convert 3.7V of a lithium battery to 3.3V to power the entire system, reducing the impact of voltage fluctuations and improving data precision. The attitude sensor uses a MPU6050 sensor chip M1, and the MCU uses a STM8S103 control chip U3. The control chip U3 is an 8-bit MCU microcontroller. In the figure, P1 is connected to the power supply, P2 is connected to the motor, P3 is used to download the program, and P4 is a control button of the toothbrush. When press the control button, a pin 13 of the control chip U3 is pulled down.

Pins 6 and 7 of the LG9110 driving chip U2 are connected to pins 1 and 20 of the STM8S103 control chip U3, respectively. Pins 1 and 4 of the LG9110 driving chip U2 are connected to the motor. Pins 23 and 24 of the MPU6050 sensor chip M1 are connected to pins 12 and 11 of the STM8S103 control chip U3, respectively. Pin 13 of the MPU6050 sensor chip M1 and pin 9 of the STM8S103 control chip U3 are both connected to pins 3 or 4 of the LN1134 power supply chip U1. Pins 2 and 3 of the LG9110 driving chip U2 are both connected to pin 3 of the LN1134 power chip U1.

Because the driving current of the MCUs TO port is not enough, only 10 mA, so the LG9110 driver chip is added to increase the driving current to 1A. When shutting down, the STM8S103 writes a SLEEP instruction to the MPU6050 and executes a HALT instruction to enter a shutdown mode, reducing power consumption and waiting for a next keystroke to wake up.

During work, the MCU reads the attitude data of M1 through a IIC bus, including acceleration data and gyroscope data. Firstly, the acceleration data includes the output data of three accelerometers, that is, XYZ coordinate data. The pitch angle and the roll angle are calculated according to the two formulas, i.e., a tan 2 (acct, accZ) and a tan(−accX/sqrt (accY*accY+acct*accZ)), and then a final pitch angle and a final roll angle are obtained after complementary filtering the calculated pitch angle and roll angle based on the gyroscope data. Finally, the motor is controlled by judging positive/negative and value size of the final pitch angle and the final roll angle.

It should be noted that the components, chips, and specific types of the components and chips used in this embodiment are only an illustration, and are not intended to limit the present application. Equivalent substitutions of other components and chips having the same or similar functions fall into protection scope of the present application.

In summary, implementing the automatic control type electric toothbrush of the present application has the following beneficial effects: rotate clockwise or counterclockwise around a driving shaft according to attitude data obtained by an attitude sensor, so that the toothbrush head is rotated in a direction from the tooth root to the dental crown, and a purpose of automatically brushing the teeth along the teeth is realized, which can protect the gums, and the automatic processing does not require manual control by the user, which improves the user experience.

The embodiments of the present application have been described above with reference to the drawings, but the present application is not limited to the specific embodiments described above, and the specific embodiments described above are merely illustrative and not restrictive. In the light of the scope of the present application, many forms may be made without departing from the scope of the present application, and these are all within protection of the present application.

The invention claimed is:

1. An automatic control type electric toothbrush, comprising a toothbrush head and a toothbrush handle which is connected to the toothbrush head by a driving shaft, wherein the toothbrush handle is provided with an attitude sensor, a control module, and a driving mechanism, and the driving mechanism comprises a motor, the control module controls the motor of the driving mechanism to drive the driving shaft to rotate the toothbrush head clockwise or counterclockwise according to attitude data obtained by the attitude sensor, so that the toothbrush head is rotated in a direction from a tooth root to a dental crown;

wherein a protective cover is provided at an end of the toothbrush handle corresponding to the toothbrush head, and an opening is formed on a side wall of the protective cover for bristles of the toothbrush head to protrude; and a X axis of a coordinate system of the attitude sensor is parallel to the toothbrush handle, a Y axis of the coordinate system is perpendicular to a mid-plane of the protective cover, and a Z axis of the coordinate system is perpendicular to a plane where the X axis and the Y axis are located;

wherein the attitude data includes XYZ coordinate data, and the control module performs following processing based on the XYZ coordinate data:

calculating a pitch angle and a roll angle based on the XYZ coordinate data, specifically comprising: calculating the pitch angle based on Y coordinate data and Z coordinate data according to a formula a tan 2(accY, accZ); and calculating the roll angle based on X coordinate data, Y coordinate data and Z coordinate data according to a formula a tan(−accX/sqrt(accY*accY+accZ*accZ)); and controlling rotation direction of the motor based on the pitch angle and the roll angle, specifically comprising: if the pitch angle and the roll angle are both positive or both negative, and absolute values of the pitch angle and the roll angle are both greater than a preset angle, the motor is controlled to run in a forward direction, and the motor drives the driving shaft to rotate the toothbrush head clockwise; and if one of the pitch angle and the roll angle is positive and the other is negative, and absolute values of the pitch angle and the roll angle are both greater than a preset angle, the motor is controlled to run in a reversed direction, and the motor drives the driving shaft to rotate the toothbrush head counterclockwise.

2. The automatic control type electric toothbrush according to claim 1, wherein the preset angle is 5°.

3. The automatic control type electric toothbrush according to claim 1, wherein the attitude sensor integrates a three-axis accelerometer and a three-axis gyroscope, and the control module comprises a power supply circuit, an MCU and a motor driving circuit, wherein the attitude sensor and the motor are connected to the MCU, the motor driving circuit is connected to the motor and the MCU respectively, and the power supply circuit is connected to the attitude sensor, the motor, the motor driving circuit, and the MCU, respectively.

4. The automatic control type electric toothbrush according to claim 3, wherein the motor driving circuit comprises a LG9110 driving chip, the power supply circuit comprises a LN1134 power chip, the attitude sensor uses a MPU6050 sensor chip, and the MCU uses a STM8S103 control chip.

* * * * *